(No Model.)
O. LAIST.
APPARATUS FOR THE MANUFACTURE OF GLYCERINE.
No. 286,448. Patented Oct. 9, 1883.
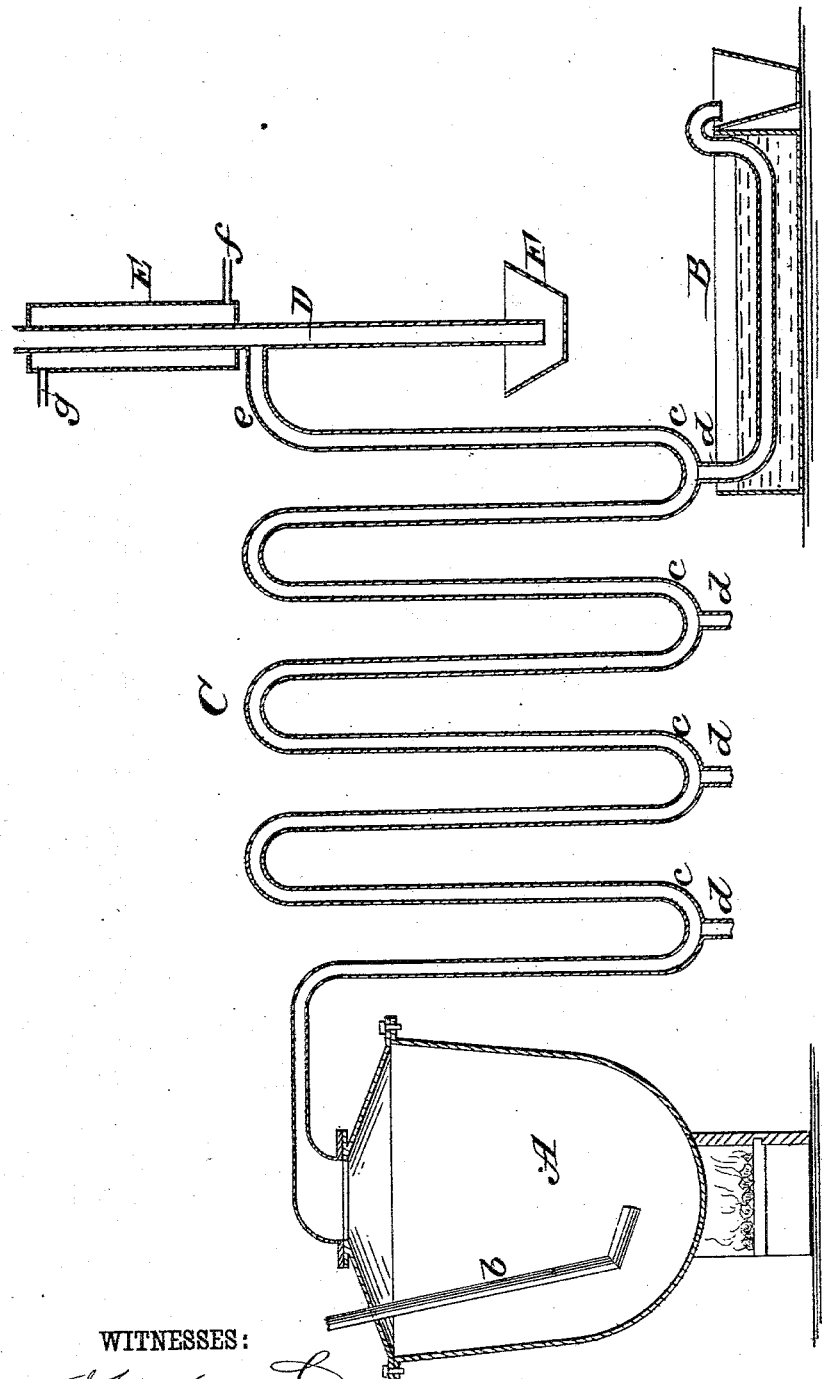
WITNESSES:
INVENTOR:
O. Laist
BY Munn & Co
ATTORNEYS.

UNITED STATES PATENT OFFICE.

OTTO LAIST, OF CINCINNATI, OHIO.

APPARATUS FOR THE MANUFACTURE OF GLYCERINE.

SPECIFICATION forming part of Letters Patent No. 286,448, dated October 9, 1883.

Application filed August 31, 1883. (No model.)

*To all whom it may concern:*

Be it known that I, OTTO LAIST, of Cincinnati, in the county of Hamilton and State of Ohio, have invented a new and useful Improvement in Apparatus for the Manufacture of Glycerine, of which the following is a full, clear, and exact description.

This invention relates to the method of refining glycerine for which Letters Patent No. 75,929 were granted me March 24, 1868, and whereby the glycerine was rendered inodorous and colorless, and with less time and expense than by previous methods. The process consisted in the employment of any oleaginous substances, fat, or fatty acids in the refinement or rectification of the glycerine, the action of said fatty or oleaginous matter being to inclose the minute globules of glycerine, and so protect the glycerine from the air, which decomposes it and forms the objectional impurity, acroleine. Said improved process also consisted in the employment of a jet of superheated steam introduced into a glycerine retort or still to facilitate the distillation of the glycerine, which, without the aid of the steam, condenses quickly from the volatile state.

In carrying out my improved process I used an apparatus in which were combined a retort for containing the glycerine and oleaginous substances, fat, or fatty acids, a steam-pipe for conducting steam at a suitable temperature down in and among the contents of the retort, a worm of many dips or bends through which the vaporized glycerine and a portion of the fatty substances were carried in the process of distillation, and condensers arranged to connect with the several lower crooks of the worm, and serving to receive the condensed glycerine as it fell from the steam when the temperature of the latter was lowered by its passing through the several bends in the worm, the less dense steam or vapor, bearing with it the fatty acids and other volatile impurities, finally passing off by the last upper bend of the worm. In this final escape of vapors and volatile impurities from the worm it has been found that no insignificant amount of glycerine also passes off, and to condense all such escaping glycerine, or "last traces" thereof, as the same might be termed, without interfering with or retarding the process of distillation, is the object of this improvement, which consists in a connection with the outlet end of the worm of a cooler of peculiar construction and action, substantially as hereinafter described.

Reference is to be had to the accompanying drawing, forming a part of this specification, in which is represented a longitudinal sectional view of an apparatus for refining or rectifying glycerine embodying my invention.

A is the retort into which the crude glycerine is placed, together with any suitable fatty body, as animal or vegetable oils, or any oleaginous acids, as margic or stearic acids and the like, and into which steam is introduced by a pipe, $b$, to keep the contents of the still at a proper vaporized state, and whereby the glycerine and a portion of the fatty substances are carried over in the process of distillation into the condensers, one of which, B, only is shown; but each lower crook, $c$, of the worm C has in practice connected with it, as at $d$, a similar condenser, which takes the condensed glycerine as it falls from the steam when the temperature of the latter is lowered in passing over the successive crooks of the worm. This, so far, is all in accordance with my previously-patented process, as hereinbefore referred to, and corresponds with the apparatus used in carrying out said process. In such apparatus glycerine of proper or marketable strength ordinarily condenses in the two first pipes or lower crooks of the worm nearest the retort, while in the remaining two pipes, supposing the worm to consist of four bent pipes in all, the glycerine is too weak for marketable purposes without concentrating the same by redistilling it, and no inconsiderable amount of glycerine is lost by its escape from the usual final bend or outlet, $e$, of the worm, along with the steam, which is less dense, and the fatty acids and other volatile impurities carried along with it. Nor is it practicable to wholly prevent such escape of uncondensed glycerine by greatly increasing or even doubling the number of bent pipes in the worm, and such extension of the worm would cause too much pressure in the still and materially affect the freedom of the distillation. To obviate all this, and at the same time effect a more regular distillation, and to save all or nearly all of the escaping glycerine, I connect the final bend or outlet $e$ of the worm with a pipe, D, open both above and below, and which forms part of a cooler, D E, the portion E consisting of an outer cold-water-circulating pipe, case, or vessel, up through which the pipe D projects or passes, to give a free or uninterrupted escape from the worm. Cold water entering the case E of the cooler by a pipe, $f$, and escaping by a waste-pipe, $g$, will, by properly cooling the pipe D, which depends upon the amount of the cooling-surface and quantity of cold water used to circulate through the cooler, cause all, or at least practically all, of the escaping glycerine to be condensed in the pipe D, and to be collected, along with other condensed vapors, in a receptacle, F, below. The condensed glycerine-water thus collected is then concentrated and redistilled.

Having thus described my invention, I claim as new and desire to secure by Letters Patent—

1. In apparatus for refining glycerine, in which the vaporized glycerine, along with other substances or vapors, is passed through a worm having a succession of dips or bends, any or each of which is furnished at its lower end with a condenser, the combination, with the worm at its outlet end, of a cooler through which cold water is made to circulate and from which the condensed vapors are precipitated, while a free vent is established above, substantially as specified.

2. The combination, with the worm C of the still, of the pipe D, open at its opposite ends, and intermediately connected with the outlet end of the worm, and the cold-water-circulating case E, arranged to receive said pipe up through it, essentially as shown and described.

3. The receptacle F, in combination with the pipe D of the cooler, open at its opposite ends, the cold-water-circulating case E, with its inlet $f$ and outlet $g$, and the worm C of the still, constructed for operation substantially as and for the purposes herein set forth.

OTTO LAIST.

Witnesses:
EDWARD C. REEMELIN,
JOHN FRANKENBERGER.